United States Patent [19]

Bosi et al.

[11] 4,355,312
[45] Oct. 19, 1982

[54] RADAR SIGNAL PROCESSOR

[75] Inventors: Gerald L. Bosi; Randolph L. Hack, both of Fullerton; Thomas C. Cantwell, Yorba Linda; Richard D. Wilmot, Buena Park, all of Calif.

[73] Assignee: Hughes Aircraft Company, Culver City, Calif.

[21] Appl. No.: 193,199

[22] Filed: Oct. 2, 1980

[51] Int. Cl.³ ............................................. G01S 13/70
[52] U.S. Cl. .................................. 343/5 VQ; 343/7.3
[58] Field of Search ............................. 343/7.3, 5 VQ

[56] References Cited

U.S. PATENT DOCUMENTS

| | | | |
|---|---|---|---|
| 3,680,095 | 7/1972 | Evans | 343/5 VQ X |
| 3,683,380 | 8/1972 | Cantwell, Jr. et al. | 343/5 VQ |
| 3,820,119 | 6/1974 | Casse et al. | 343/7.3 |
| 3,969,616 | 7/1976 | Mimken | 343/7.3 X |
| 3,987,441 | 10/1976 | Miller | 343/7.3 |
| 4,048,636 | 9/1977 | Bishop | 343/5 VQ X |
| 4,195,297 | 3/1980 | Conner, Jr. | 343/7.3 X |

*Primary Examiner*—Malcolm F. Hubler
*Attorney, Agent, or Firm*—William J. Benman, Jr.; William H. MacAllister

[57] ABSTRACT

A processor for operating on video and azimuth signals from a radar system having an antenna which scans in azimuth. The processor enhances the signal-to-noise ratio of the video signals while imposing thereon a substantially constant azimuth delay error.

The processor includes a first circuit for forming and storing a count indicative of the video signal history in each range zone. The processor also includes a second circuit for generating and removing a flag signal indicative of azimuth leading and trailing edges respectively of a target pulse in the video signal. A gating circuit is included to pass video signals, for a given range zone, to an output terminal during the presence of a flag signal associated with the zone.

13 Claims, 3 Drawing Figures

RADAR SIGNAL PROCESSOR

The government of the United States of America has rights in this invention pursuant to Contract No. N00024-73-C-1175 awarded by the Department of the Navy.

BACKGROUND OF THE INVENTION

1. Field of the Invention

This invention relates to radar signal processors. More specifically, this invention relates to improvements in radar signal processors providing enhanced video signal-to-noise ratios.

While the present invention is described herein with reference to specific embodiments, it should be understood that the invention is not limited thereto. The improvements of the present invention may be adapted and employed for a variety of requirements as those skilled in the art will recognize in light of the present disclosure.

2. Description of the Prior Art

For radar systems whose primary function is display, only a limited amount of hardware can be devoted to filtration functions. This typically limits video filters used in displays to types such as single loop video integrators. A single loop video integrator processes the incoming video signal using an integration technique that substantially improves the signal-to-noise ratio of the system. Unfortunately, since the response of the integrator follows the signal with some delay, this technique causes a delay error (azimuth bias error) which causes the image to be displayed in an improper azimuth position. This azimuth bias error varies with the strength of the video signal, making bias delay compensation difficult if not impossible.

SUMMARY OF THE INVENTION

The signal processor of the present invention operates on video and azimuth signals from a radar system having a scanning antenna to improve the signal-to-noise ratio of the video signal while ensuring the azimuth bias error is substantially constant and therefor readily correctable.

The radar signal processor of the present invention includes a circuit which forms and stores a count which is indicative of the history of the amplitude of the video signal within each of a plurality of range zones.

A second circuit is included which generates a flag bit when a count threshold is exceeded. For each range zone, the flag bit is stored along with the count. The presence of the flag bit indicates that the leading edge of a target has been detected in the azimuth dimension.

Logic is provided to gate the radar video signal through the processor to an output terminal whenever the flag bit is present.

DESCRIPTION OF THE INVENTION

Figure 1:
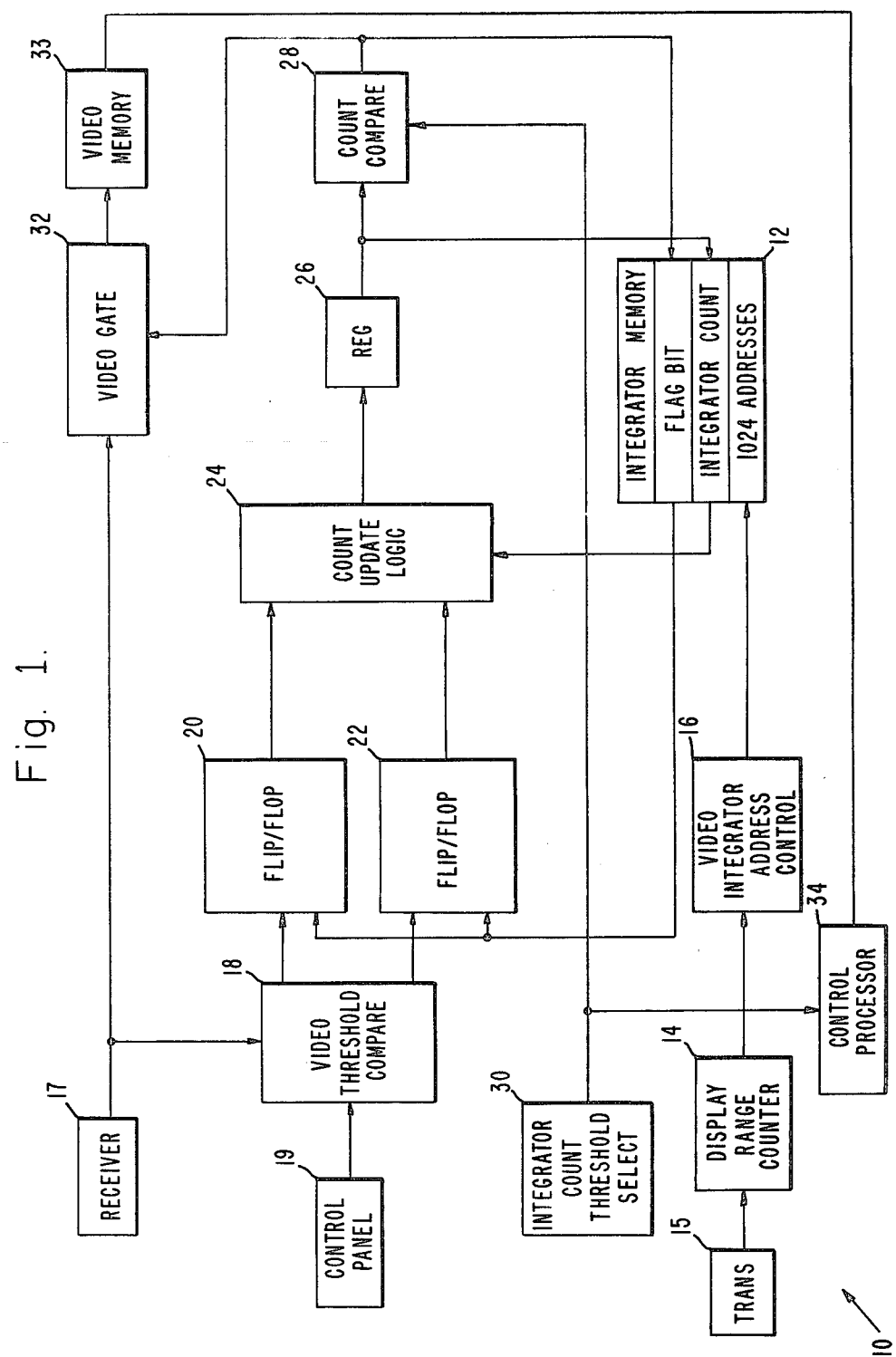
FIG. 1 is a block diagram representation of the radar signal processor of the present invention.

A block diagram of the processor 10 of the present invention is shown in FIG. 1. It includes a digital memory 12, a display range counter 14, a video integrator address control 16, a display video threshold comparator 18, flip/flops 20 and 22, count update logic 24 and a shift register 26 for forming and storing a count indicative of the video signal history for each of a plurality of range zones.

The digital memory 12 provides one address for each display range zone. At each address the memory can store a six bit word which is then used to provide video integration for the range zone unique to that address. Five of the memory bits stored at each address are used to store a running count of the digital video history. The digital video history is a record of the number of sweeps during which the received video signal exceeded an operator selected i.e. display threshold. The video display threshold selection is made at an operator control panel 19.

The sixth bit is used as a flag bit to indicate whether the count threshold has been reached for a particular range bin. For example, if the flag bit is false or at a logic level "0," it indicates that the count threshold has not been reached and likewise, if the flag bit is true or at a logical "1" level, the count threshold has been reached.

The memory 12 is addressed by the range counter 14 and the video integrator address control 16. The range counter 14 is synchronized to the radar range by a master trigger signal from a radar transmitter 15.

The radar video signal from the radar receiver 17 is compared to the operator selected video display threshold by the comparator 18. The comparator 18 provides inputs to flip/flops 20 and 22. Flip/flops 20 and 22 provide data to the count update logic which determines the extent to which the count is to change.

The previous count for a particular range zone address is provided by the memory 12 to the count update logic 24. The count update logic 24 then increments or decrements the count according to the outputs of the flip/flops 20 and 22 and stores the new count in register 26. In the preferred embodiment, if the threshold is exceeded and the flag is false, the count is incremented by two by flip/flop 20 and count update logic 24. If the threshold is exceeded and the flag is true, the count is decremented by one by flip/flop 20 and logic 24. If the threshold is not exceeded and the flag is false, the count is decremented by one by flip/flop 22 and logic 24. If the threshold is not exceeded and the flag is true, the count is incremented by two by flip/flop 22 and logic 24. The count will not decrement below zero. The count update logic 24 includes a shift register, a summer or adder and reset logic, (not shown). It is understood, however, that other component devices or circuits can be used to perform the function of count update logic 24 without departing from the scope of this invention. A microprocessor, for example, could provide such a feasible alternative.

The count stored in register 26 is input to the integrator memory 12 where it replaces the previous count at the same range zone address. The current count is also input to a comparator 28 where it is compared to the integrator count threshold provided by the register 30.

A count comparator 28 and an integrator count threshold selection circuit 30 are provided for adding or removing a flag bit indicative of a leading or trailing edge of a target in the azimuth dimension when the stored count, for a given range zone, exceeds the predetermined integrator count threshold.

The comparator 28 provides a logic level "1" output if the integrator count threshold is exceeded and a logic level "0" output if the integrator count threshold is not exceeded. The flag bit is input to the memory 12 at the same range bin address as the corresponding integrator count.

If the flag is true, the digitized video signal is passed from the radar receiver 17 to a video memory 33 by a gate 32.

As an optional feature, the digital video can be forced to be at least a minimum discernible level when the correlator flag is true so that the digital video display is nonzero when the flag bit is true. This allows the digital video azimuth width to be the same as the analog video azimuth width.

When the count threshold is exceeded, as when a target leading edge is detected, the flag is true, the count is reset to zero and counter logic is reversed so that a video amplitude exceeding the display threshold decrements the counter by "1" and an amplitude not exceeding the display threshold increments the counter by "2". This indicates that the processor 10 is now in a mode searching for the trailing edge of the video signal. The trailing edge threshold is typically equal to the leading edge threshold. When it is reached, the flag bit is removed by logic 24 and counter logic is reversed once again, and the video input to the video memory for this range bin is set to zero. The next range clock from the display range counter 14 increments the display range counter 14 which then addresses the next range zone in the video memory 12 to reinitiate the correlation process.

Because the processor 10 is a binary accumulator, it does not directly provide an indication of the signal amplitude for display. Instead of displaying the output of the integrator directly, as in single loop integration technique of the prior art, the present invention passes the digitized video for memory and/or display when a predetermined count is reached.

Since the target is expected to provide a certain azimuth profile, i.e., (sin x/x), the expected azimuth delay in declaring a target leading and trailing edge can be accurately predicted. It is nearly constant for each integrator count threshold regardless of the video signal amplitude. This makes bias delay compensation by microprocessor 34 possible.

The video memory 33 implements the specific objective of storing radar video for azimuth compensation. Radar video is received as a sequence of range bins on standard radar sweep lines. Each range bin is digitized into three or four bits of video. The output video is in the form of horizontal raster lines for a composite video format for display. The microprocessor 34 sends data to the video memory 33 which defines the initial range start point and azimuth angle (corrected for bias delay) of a sweep line and also a control which initiates the loading of a sweep line. Old video information is read out of the memory 33 while new video information is written into the memory 33. For each cell, peak detection (not shown) is used to combine old video with new video for the cell.

Figure 2:
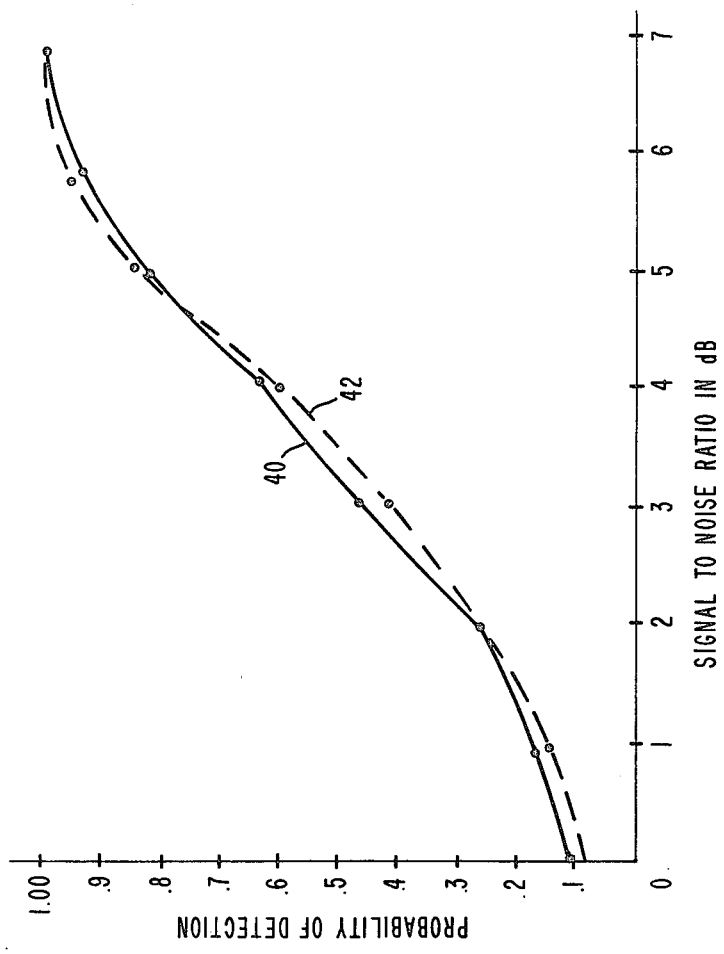
FIG. 2 is a graph comparing the signal detectability of the present invention to that of a typical single loop integrator.
Figure 3:
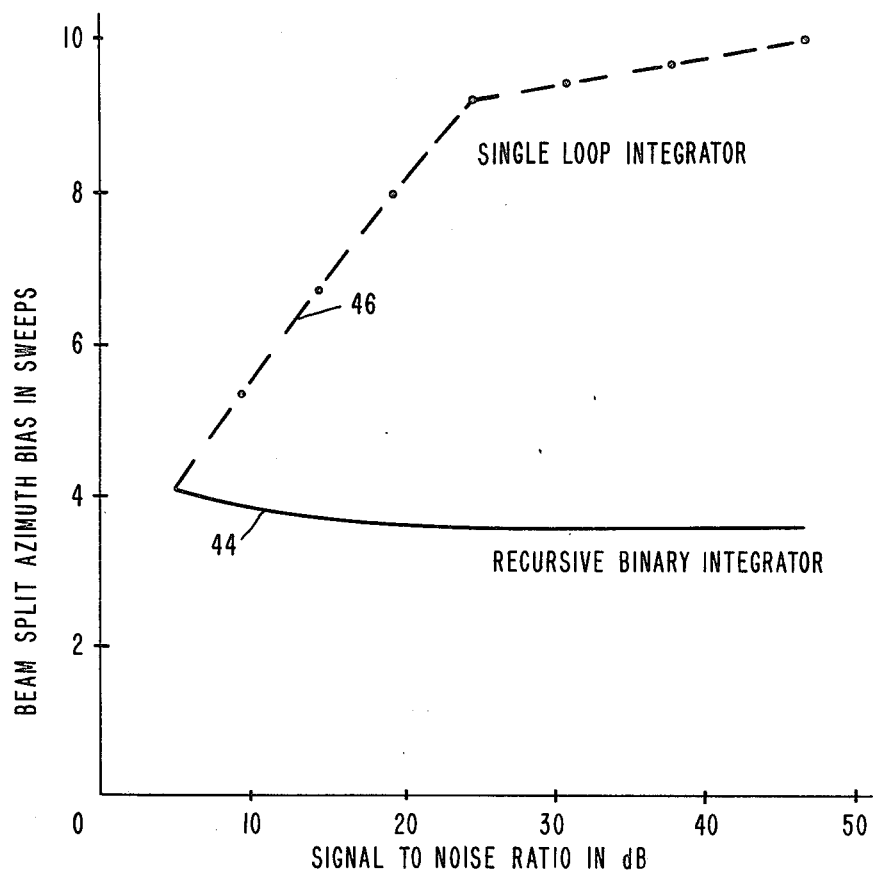
FIG. 3 is a graph showing the azimuth bias comparison of the present invention to that of a typical single loop integrator.

The performance of the present invention as obtained from computer simulations is shown in FIGS. 2 and 3. FIG. 2 compares the signal detectability of the present invention 40 with that of a typical signal loop integrator 42 for radar with thirteen sweeps per azimuth beamwidth. These results show that the signal detection capability of the two integrators is essentially identical and that no detectability loss is incurred by using the signal processor of the present invention.

FIG. 3 compares the azimuth centroid (beamsplit) bias of the present invention 44 with that of a typical single loop integrator 46. Note that the single loop integrator azimuth bias varies from four to ten sweeps, as the signal-to-noise ratio changes for an azimuth variation of 250 percent. On the contrary, the azimuth bias of the present invention is effectively constant. This allows a very simple and very accurate azimuth bias correction to be made for the radar signal processor of the present invention.

Thus, the signal processor 10 of the present invention provides approximately the same detectability as the single loop integrator, a very predictable delay in leading and trailing edge response and significantly improved azimuth accuracy as compared to the single loop integration technique.

While the present invention has been described herein with reference to a particular embodiment, it should be understood that the invention is not limited thereto. One skilled in the art to which this invention pertains will recognize that many circuits and subsystems can be employed to implement a variety of functions described above. It is nonetheless contemplated by the appended claims to cover any and all such modifications within the teachings of the present invention.

We claim:

1. A processor for operating on video and azimuth signals from a radar system, having an antenna which scans in azimuth, such that the signal-to-noise ratio of the video signals being processed therethrough is enhanced while the delay in detecting the leading edge of the target in the azimuth dimension is substantially constant, said processor comprising:
   first means for forming and storing a count indicative of the video signal history for each of a plurality of range zones;
   second means for providing a flag signal indicative of a leading edge of a target in the azimuth dimension when the stored count associated with a given range zone exceeds a preselected level and for removing said flag signal on a trailing edge of said target; and
   gating means for allowing the radar video signals for a given zone to pass to a display memory during the presence of a flag signal associated with said given zone.

2. The process of claim 1 wherein said first means includes means for storing a video threshold level and for comparing said radar video signals to said video threshold level.

3. The processor of claim 2 wherein said first means includes means for incrementing the count a first preselected amount for each respective range zone during each antenna scan when the radar video signal for the given range zone exceeds said first threshold level and for decrementing the count a second preselected amount during each antenna scan when the radar video signal for the given range zone does not exceed said first threshold.

4. The processor of claim 3 wherein said first means includes means for incrementing the count by said first preselected amount for each respective range zone during each antenna scan when the flag signal is present and the radar video signal for the given range zone does not exceed said video threshold and for decrementing the count by said second preselected amount during each antenna scan when the flag signal is present and the radar video signal for the given range zone exceeds said video threshold.

5. The processor of claim 1 wherein said second means includes means for storing a first count threshold level.

6. The processor of claim 5 wherein said second means includes means for comparing the current count to said first count threshold level and for providing a flag signal when the current count reaches said first count threshold.

7. The processor of claim 6 wherein said second means includes means for resetting the count whenever the count reaches a count threshold.

8. The processor of claim 7 wherein said second means includes means for removing the flag signal when the count reaches a second count threshold.

9. A processor for operating on video and azimuth signals from a radar system having an antenna which scans in azimuth such that the signal-to-noise ratio of the video signals being processed therethrough is enhanced while the delay in detecting the leading edge of the target in the azimuth dimension is substantially constant, said processor comprising:

first means for forming and storing a count indicative of the video signal history for each of a plurality of range zones, said first means including means for storing a video threshold, means for comparing said video signals to said threshold, means for incrementing the count a first preselected amount for each respective range zone during each antenna scan when the radar video signal for the given range zone exceeds said video threshold level and for decrementing the count a second preselected amount during each antenna scan when the radar video signal for the given range zone does not exceed said video threshold, and means for incrementing the count by said first preselected amount for each respective range zone during each antenna scan when a flag signal is present and the radar video signal for the given range zone does not exceed said video threshold and for decrementing the count by said second preselected amount during each antenna scan when the flag signal is present and the radar video signal for the given range zone exceeds said video threshold;

second means for providing said flag signal indicative of a leading edge of a target in the azimuth dimension when the stored count associated with a given range zone exceeds a preselected level and for removing said flag signal on a trailing edge of said target when the stored count associated with a given range zone exceeds a preselected level; and gating means for allowing the radar video signals for a given zone to pass to a display memory during the presence of a flag signal associated with said given zone.

10. The processor of claim 9 wherein said second means includes means for resetting the count whenever the count reaches said preselected levels.

11. A method for operating on video and azimuth signals from a radar system having an antenna which scans an azimuth such that the signal-to-noise ratio of the video signals being processed therethrough is enhanced while the delay in detecting the leading edge of the target in the azimuth dimension is substantially constant, including the steps of:

(a) forming and storing a count indicative of the video signal history for each of a plurality of range zones, including the steps of storing a video threshold, comparing the video signals to the threshold, incrementing the count a first preselected amount for each respective range zone during each antenna scan when the radar video signal for the given range zone exceeds the video threshold and for decrementing the count a preselected amount during each antenna scan when the radar video signal for the given range zone does not exceed said video threshold, and incrementing the count by said first preselected amount for each respective range zone during each antenna scan when a flag signal is present and the radar video signal for the given range zone does not exceed said video threshold or decrementing the count by said second preselected amount during each antenna scan when the flag signal is present and the radar video signal for the given range zone exceeds said video threshold;

(b) providing said flag signal to indicate the leading edge of a target in the azimuth dimension when the stored count associated with a given range zone exceeds a preselected level and removing the flag signal on a trailing edge of said target when the stored count associated with a given range zone exceeds a preselected level; and (c) gating the radar video signals for a given range zone to a video display memory during the presence of the flag signal associated with said given zone.

12. The method of claim 11 wherein said second step further includes the step of resetting the count whenever the count reaches said preselected levels.

13. The method of claim 11 further including the step of compensating in real-time for azimuth bias error in the stored video signals.

* * * * *